US009370976B2

United States Patent
McCoy et al.

(10) Patent No.: US 9,370,976 B2
(45) Date of Patent: Jun. 21, 2016

(54) INTERCHANGEABLE HITCH BALL ASSEMBLY

(71) Applicant: Cequent Performance Products, Inc., Plymouth, MI (US)

(72) Inventors: Richard W. McCoy, Granger, IN (US); Mike Orlos, Livonia, MI (US)

(73) Assignee: CEQUENT PERFORMANCE PRODUCTS, INC., Plymouth, MI (US)

( * ) Notice: Subject to any disclaimer, the term of this patent is extended or adjusted under 35 U.S.C. 154(b) by 0 days.

(21) Appl. No.: 13/666,456

(22) Filed: Nov. 1, 2012

(65) Prior Publication Data

US 2013/0127137 A1    May 23, 2013

Related U.S. Application Data

(60) Provisional application No. 61/554,472, filed on Nov. 1, 2011.

(51) Int. Cl.
| | | |
|---|---|---|
| *B60D 1/06* | (2006.01) | |
| *B60D 1/52* | (2006.01) | |
| *B60D 1/07* | (2006.01) | |
| *B60D 1/60* | (2006.01) | |

(52) U.S. Cl.
CPC ........ *B60D 1/06* (2013.01); *B60D 1/075* (2013.01); *B60D 1/52* (2013.01); *B60D 1/60* (2013.01)

(58) Field of Classification Search
CPC ............ B60D 1/06; B60D 1/065; B60D 1/52; F16B 21/065
USPC ............... 280/513, 511, 491.5; 403/328, 324, 403/322.2, 322.3; 411/901, 21, 48, 28; 81/177.85
See application file for complete search history.

(56) References Cited

U.S. PATENT DOCUMENTS

| | | | | |
|---|---|---|---|---|
| 2,898,797 | A * | 8/1959 | Bronstein | 411/348 |
| 2,901,804 | A * | 9/1959 | Williams | 411/348 |
| 2,968,205 | A * | 1/1961 | Springate | 411/348 |
| 4,201,400 | A | 5/1980 | Hoogenbosch | |
| 4,367,663 | A * | 1/1983 | Merics | 81/177.2 |
| 4,522,421 | A | 6/1985 | Vance | |
| 4,865,485 | A * | 9/1989 | Finnefrock, Sr. | 403/322.2 |
| 4,988,248 | A * | 1/1991 | Flux | 411/348 |
| 5,280,941 | A | 1/1994 | Guhlin | |
| 5,390,571 | A * | 2/1995 | Fox et al. | 81/177.85 |
| 5,472,222 | A | 12/1995 | Marcy | |
| 5,531,140 | A * | 7/1996 | Chow | 81/177.85 |
| 5,741,022 | A | 4/1998 | Wass et al. | |
| 6,139,043 | A | 10/2000 | Gries et al. | |
| 6,616,168 | B2 | 9/2003 | Belinky | |
| 6,695,338 | B1 | 2/2004 | Roberts | |
| 6,783,144 | B2 | 8/2004 | McCoy et al. | |
| 6,837,511 | B1 * | 1/2005 | Johnson, III | 280/511 |
| 6,889,582 | B2 * | 5/2005 | Wilhelm | 81/177.85 |

(Continued)

*Primary Examiner* — Anne Marie Boehler
(74) *Attorney, Agent, or Firm* — McDonald Hopkins LLC

(57) ABSTRACT

A hitch ball assembly generally includes a ball member and a body connected to the ball member. A passageway extends longitudinally within the body and at least one locking member may be in communication with the passageway to lock the hitch ball in place. An elongated member within the passageway is biased to engage the locking member. The body further includes an opening arranged transverse to the passageway. A release mechanism is positioned within an opening in the body transverse to the passageway. The release member is in communication with the elongated member to move the elongated member between a locked position and an unlocked position.

28 Claims, 14 Drawing Sheets

(56) References Cited

U.S. PATENT DOCUMENTS

| | | |
|---|---|---|
| 6,969,090 B1 | 11/2005 | Works et al. |
| 6,983,950 B2 | 1/2006 | McCoy et al. |
| 7,168,727 B2 | 1/2007 | Dick |
| 7,413,212 B2 | 8/2008 | Hsai |
| 7,690,673 B1 | 4/2010 | Kraai |
| 8,011,685 B2 | 9/2011 | Belinky et al. |
| 8,272,661 B2 | 9/2012 | Erickson |
| 2005/0104326 A1 | 5/2005 | Hord et al. |
| 2007/0108729 A1 | 5/2007 | Dick |
| 2008/0087143 A1* | 4/2008 | Hsieh ............ 81/177.85 |
| 2009/0267323 A1* | 10/2009 | Belinky et al. ........ 280/511 |
| 2010/0109285 A1 | 5/2010 | Stanifer et al. |

* cited by examiner

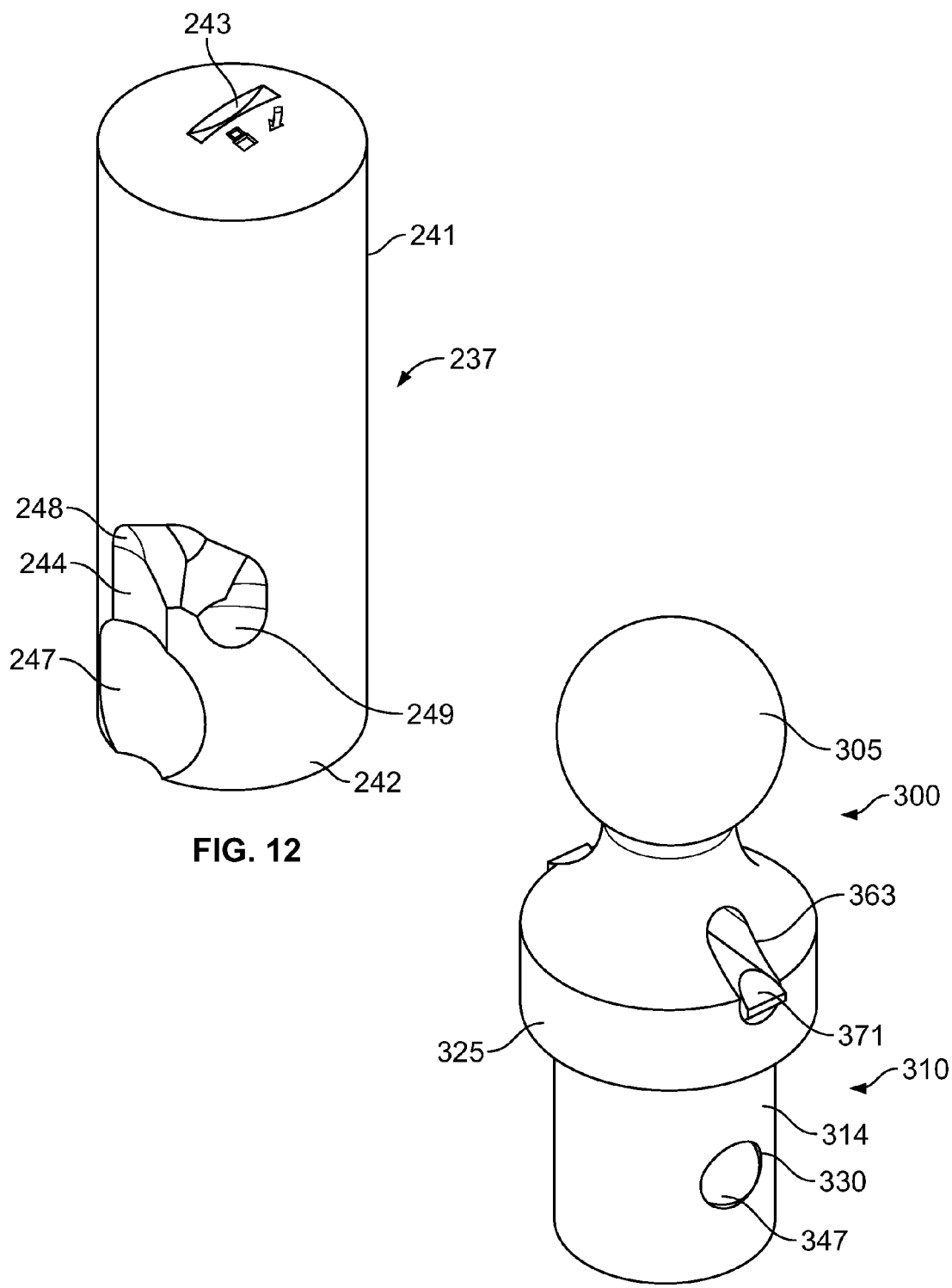

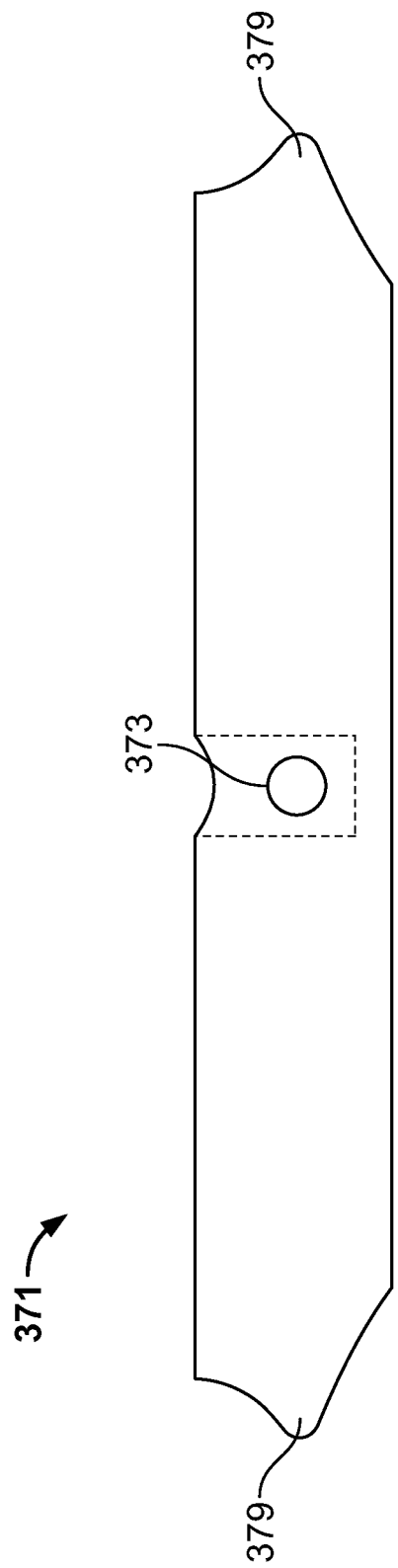

INTERCHANGEABLE HITCH BALL ASSEMBLY

CROSS-REFERENCE TO RELATED APPLICATIONS

This application claims priority to U.S. Provisional Patent Application No. 61/554,472 entitled "INTERCHANGEABLE HITCH BALL ASSEMBLY," filed on Nov. 1, 2011, which is hereby incorporated by reference in its entirety.

FIELD OF INVENTION

This application relates to a hitch ball and more particularly to an interchangeable hitch ball assembly.

BACKGROUND

Many vehicles are designed to transport freight, goods, merchandise, personal property, and other such cargo. Often such vehicles are arranged to tow a trailer by attaching the trailer to the towing vehicle, such as through the use of a hitch assembly. Typically, a trailer hitch is utilized to connect a towed vehicle or trailer to a towing vehicle, such as a truck, for example.

There are many different types of trailer hitches in the art that may be attached to the towing vehicle in a variety of ways, depending on the type of hitch. Some of the most common types of hitches include gooseneck, fifth wheel, front mount, and the like. Typically, trailers are connected to a towing vehicle by way of a hitch assembly including a ball hitch or member secured to the towing vehicle and a ball socket coupling mechanism on the towed vehicle that mounts over the ball and thereby allows for the trailer to pivot behind the towing vehicle.

Ball and socket-type towing mechanisms are used on a wide variety of vehicles, such as automobiles, SUVs, trucks, tractors, and the like. The systems are used to tow various vehicles, such as trailers, mobile homes, other non-operating vehicles, and the like. The socket to hitch ball connection allows relative movement between the towing vehicle and the trailer as the towing vehicle makes turns, traverses uneven or rough terrain, and passes along inclining and declining roadways.

The hitch ball or member of some hitches, such as gooseneck hitch, for example, is commonly mounted in the bed of a towing vehicle, such as a pickup truck, near the longitudinal centerline of the bed. This may allow the weight of the trailer to be generally distributed between the tires on the two sides of the pickup truck. Typically, a sub-frame assembly, such as a hitch, is secured to the towing vehicle. The ball member is attached or otherwise secured to the hitch for use in towing the towed vehicle.

This type of hitch is often secured to the truck structure in an opening cut in the bed of the truck, so that a substantial portion of the hitch attachment is located below the bed of the truck. In addition, the ball member typically may be removed to a stowed position to ensure that the use of the bed is not substantially hindered by the presence of the ball.

The socket structure of a coupler mechanism is typically affixed to the trailer or towed vehicle. Generally, the coupler is secured to the tongue of the vehicle or trailer, usually a forward extension of the frame. The coupler typically includes a manually operated clamping arrangement that retains the ball member in the socket and thus the towed trailer or vehicle to the towing vehicle.

Often, the trailers and sockets are of different sizes, requiring ball members of different sizes. Also, in some instances, it is preferable to be able to remove the ball member for security purposes in order to protect it from corrosion, or to simply store it when it is not being used.

Hitch assemblies of various sizes have been used for this purpose. As a result, it is generally common for different types of trailers to be equipped with sockets that may be adapted for use with hitch balls of different sizes or diameters. Therefore, attempts have been made to provide interchangeable hitch balls to allow the towing vehicle to accommodate a variety of different trailer sockets on the towed vehicle. However, such attempts suffer from several deficiencies.

For example, such hitch balls are typically provided with a threaded mounting shank that is inserted through an aperture in a hitch bar on the towing vehicle. The hitch ball is secured to the hitch bar with a nut and locking washer. This typically requires significant user intervention to secure or remove the hitch ball from the hitch bar. Further, such hitch balls may not prevent a trailer socket from being coupled to the hitch ball prior to securing the hitch ball to the hitch bar.

Over the years, towing balls of various diameters have been used and several industry standard sizes (e.g., 1⅞ inch, 2 inch, and 2 5/16 inch in diameter) are now in frequent use. As a result, it is not uncommon for a single towing vehicle to be used to tow various trailers where those trailers are equipped with socket assemblies adapted for operative connection with towing balls of different diameters. Thus, there is a need in the art for a hitch ball assembly that allows for an easy and convenient interchange of towing balls of different diameters, thereby permitting the hitch of the towing vehicle to be tailored to fit the socket assembly of the towed vehicle or trailer and thereby meet the application needs.

Therefore, there is a need in the art for an improved hitch ball assembly that may be easily interchangeable with the hitch of the towing vehicle.

SUMMARY

A hitch ball assembly is generally presented. The hitch ball assembly includes a ball member and a body connected to the ball member. A passageway extends longitudinally within the body. At least one locking member may be positioned in communication with the passageway to facilitate locking the hitch ball in place. An elongated member is located within the passageway and biased to engage the locking member. The body further includes an opening arranged transverse to the passageway. A release mechanism is positioned within the opening and in communication with the elongated member to move the elongated member between a locked position and an unlocked position.

In an embodiment, the release mechanism comprises a slide that is slidably movable within the opening. The slide may include a camming surface in communication with a pin of the elongated member. The camming surface may comprise a first ramped surface and a second ramped surface opposite the first ramped surface. An optional resting slot may be positioned next to each ramped surface.

In an embodiment, the release mechanism may comprise a lift bar connected to the elongated member and positioned within the opening. The lift bar may include an engaging portion, such as a tapered end portion, to facilitate raising of the lift bar and move the elongated member between locked and unlocked positions.

BRIEF DESCRIPTION OF THE DRAWINGS

Operation of the invention may be better understood by reference to the following detailed description taken in connection with the following illustrations, wherein:

FIG. 12 is a perspective view of a plunger of the interchangeable hitch ball assembly of FIG. 7;

FIG. 13 is a perspective view of other embodiments of an interchangeable hitch ball assembly in a locked position;

FIG. 16 is an elevational view of a lift bar of the interchangeable hitch ball assembly of FIG. 13.

DETAILED DESCRIPTION

Figure 1:
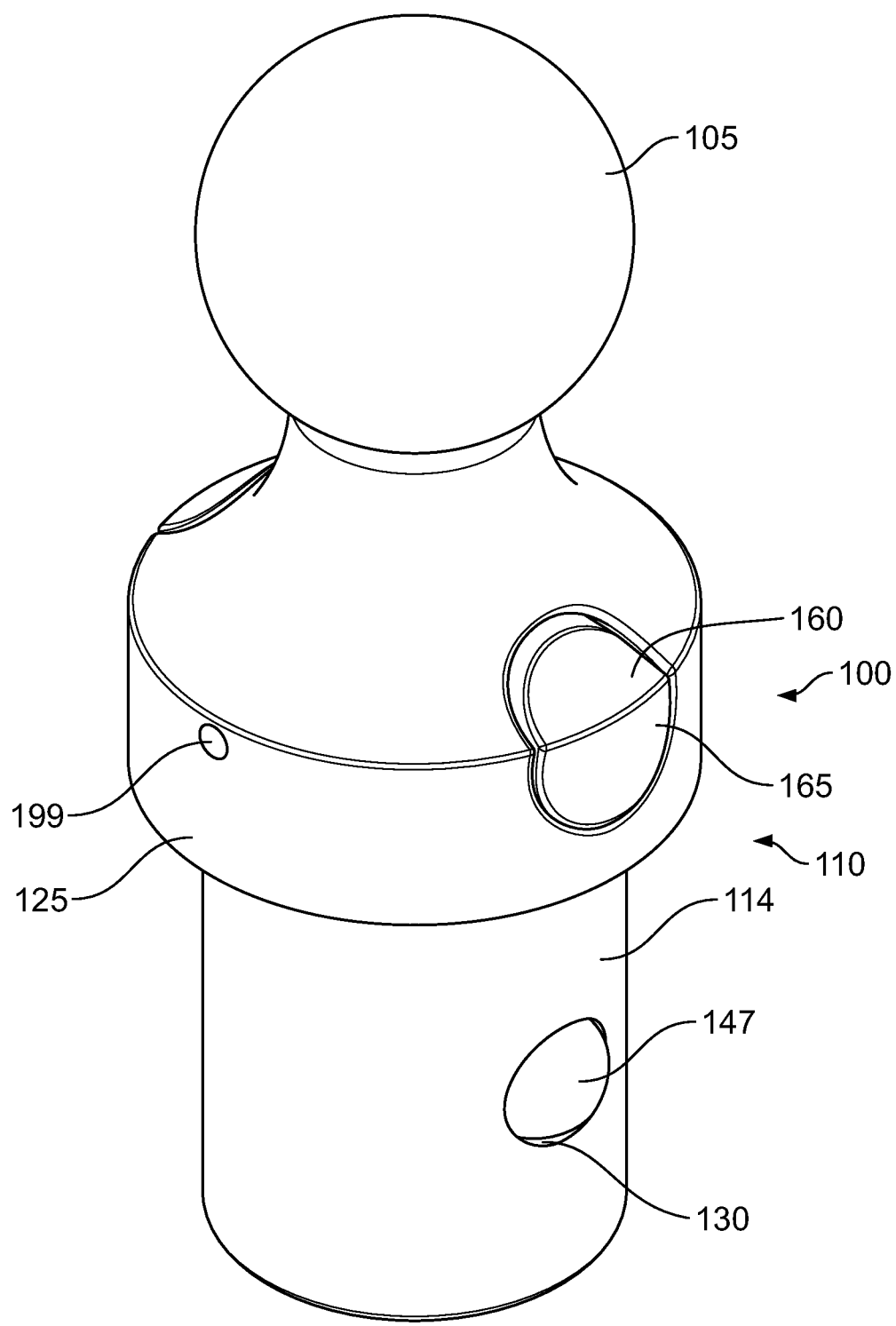
FIG. 1 is a perspective view of an interchangeable hitch ball assembly in a locked position.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

An interchangeable hitch ball assembly 100 is shown in FIGS. 1-4 and 7. The interchangeable hitch ball assembly 100 may be capable of being selectively secured to a towing assembly, such as by way of a non-limiting example, a gooseneck hitch assembly, secured to a towing vehicle. The interchangeable hitch ball assembly 100 may be capable of being secured to and removed from the towing assembly of the towing vehicle as described below. Further, a towed vehicle coupler assembly, such as by way of a non-limiting example, a gooseneck coupler, may be selectively secured to the interchangeable hitch ball assembly 100 in any appropriate manner.

The interchangeable hitch ball assembly 100 may include a ball member 105 and a body 110. The ball member 105 may be shaped to receive a corresponding socket (not shown) of a coupler of a towed vehicle that may be towed. It is to be understood that the ball member 105 may be of any appropriate or conventional shape and size, such as by way of a non-limiting example being generally spherical in shape. The ball member 105 may also be a separate piece from the body 110 or may be integrally formed with the body 110 through forming as a single piece. If the ball member 105 and body 110 are separate pieces, they may be secured together by any appropriate means, such as by fasteners, welding, adhesives or the like. The interchangeable hitch ball assembly 100 may be removably secured to a hitch receiver on an automobile, truck, SUV, or other vehicle in any appropriate manner. By way of a non-limiting example, the interchangeable hitch ball assembly 100 may be selectively secured to a hitch receiver as shown and described as being part of an under bed gooseneck hitch mounting system shown and described in U.S. Patent Application Ser. No. 20100109285, which is hereby incorporated by reference.

In some embodiments, the body 110 may include an insert portion 114. The insert portion 114 may be of any appropriate shape or size, such as being shaped for insertion into a hitch receiver of a gooseneck coupler. Although illustrated as substantially cylindrical in shape, it is to be understood that the insert portion 114 may be shaped to accommodate any type of hitch receiver and as such may be of any appropriate shape and size; such as by way of non-limiting example being generally square, rectangular, oval or the like cross-sectional shape.

The insert portion 114 may also include a cavity 120. The cavity 120 may be positioned at any appropriate location within the insert portion 114. The cavity 120 may be of any appropriate shape or size, such as by way of a non-limiting example being a generally cylindrical shape. The body 110 may also be provided with a flange member 125. The flange member 125 may be of any appropriate shape or size. In some embodiments, the flange member 125 may be adapted to rest on a hitch receiver. The insert portion 114 may also include an aperture 130. In some embodiments, the insert portion 114 may include a pair of apertures 130 such that the apertures 130 may be located through the insert portion 114. The apertures 130 may be of any appropriate shape or size, such as by way of non-limiting examples being generally cylindrical, circular, oval, square, rectangular, polygonal or the like shape. The apertures 130 may also be positioned at any appropriate location on the insert portion 114, such as being transversely positioned from each other.

The interchangeable hitch ball assembly 100 may also include a passageway 135. The passageway 135 may be of any appropriate shape or size, such as by way of a non-limiting example being a generally cylindrical shape. In some embodiments, the passageway 135 may extend through the body 110 into the cavity 120 within the insert portion 114. In some embodiments, the passageway 135 need not extend into the ball member 105.

The interchangeable hitch ball assembly 100 may also include a plunger 137. The plunger 137 may be located within the cavity 120 of the insert portion 114. The plunger 137 may be of any appropriate shape or size and is not limited to that shown in the drawings. The interchangeable hitch ball assembly 100 may also include an elongated member 139. The elongated member 139 may be of any appropriate shape or size, such as by way of a non-limiting example being of a generally cylindrical shape. The elongated member 139 may include a first end 141 and a second end 143. The first end 141 may be operatively connected to the plunger 137 in any appropriate manner, such as by way of non-limiting examples, being fastened, welded, using adhesives, or the like.

The interchangeable hitch ball assembly 100 may further include a locking device 145. It is to be understood that the locking device 145 may be of any appropriate construction. In some embodiments, the locking device 145 may include a locking member 147, such as by way of a non-limiting example, a pair of generally circular ball bearing members. It should be understood, however, that the locking members 147 may be of any appropriate shape and size and are not limited to the ball bearings shown in the drawings. The locking members 147 may be selectively positionable from a locked position whereby the locking members 147 may extend generally out of the apertures 130 to and from an unlocked position whereby the locking members 147 may be generally positioned within the apertures 130. In some embodiments, the locking members 147 may extend out of the insert portion 114 and in the unlocked position may be positioned within the insert portion 114.

The locking device 145 may further include a biasing member 150. In some embodiments, the body 110 may include a lip 152 that may be located above the cavity 120. The biasing member 150 may be of any appropriate type of biasing means, such as by way of a non-limiting example being a spring, or more specifically a compression spring. The biasing member 150 may be positioned along the elongated member 139 between the plunger 137 and the lip 152 of the body 110 to bias the plunger 137 toward the locking members 147. The biasing member 150 may bias the plunger 137 vertically downward toward a locked position.

Figure 2:
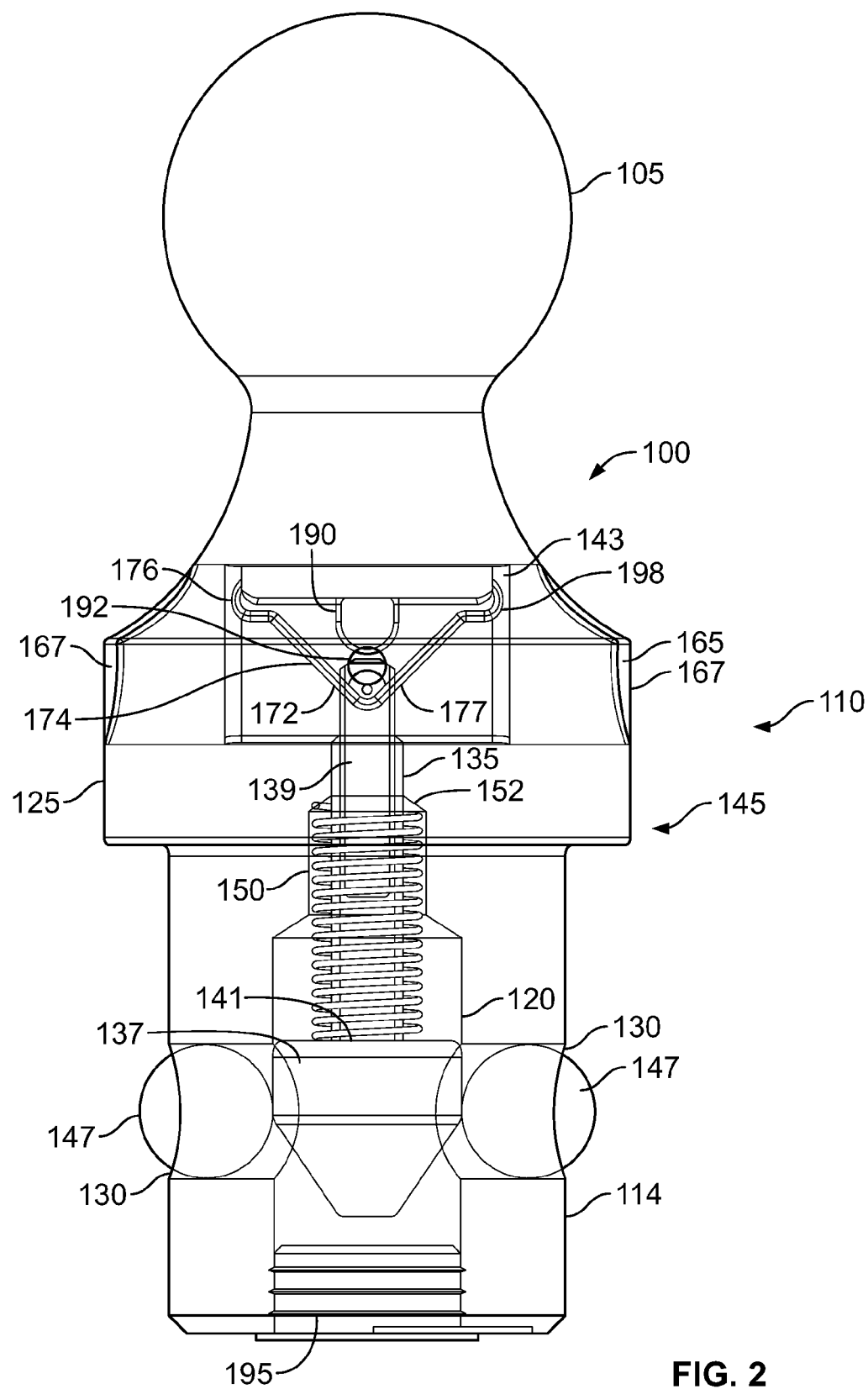
FIG. 2 is an elevational view of the interchangeable hitch ball assembly in the locked position with a portion thereof in phantom.
Figure 3:
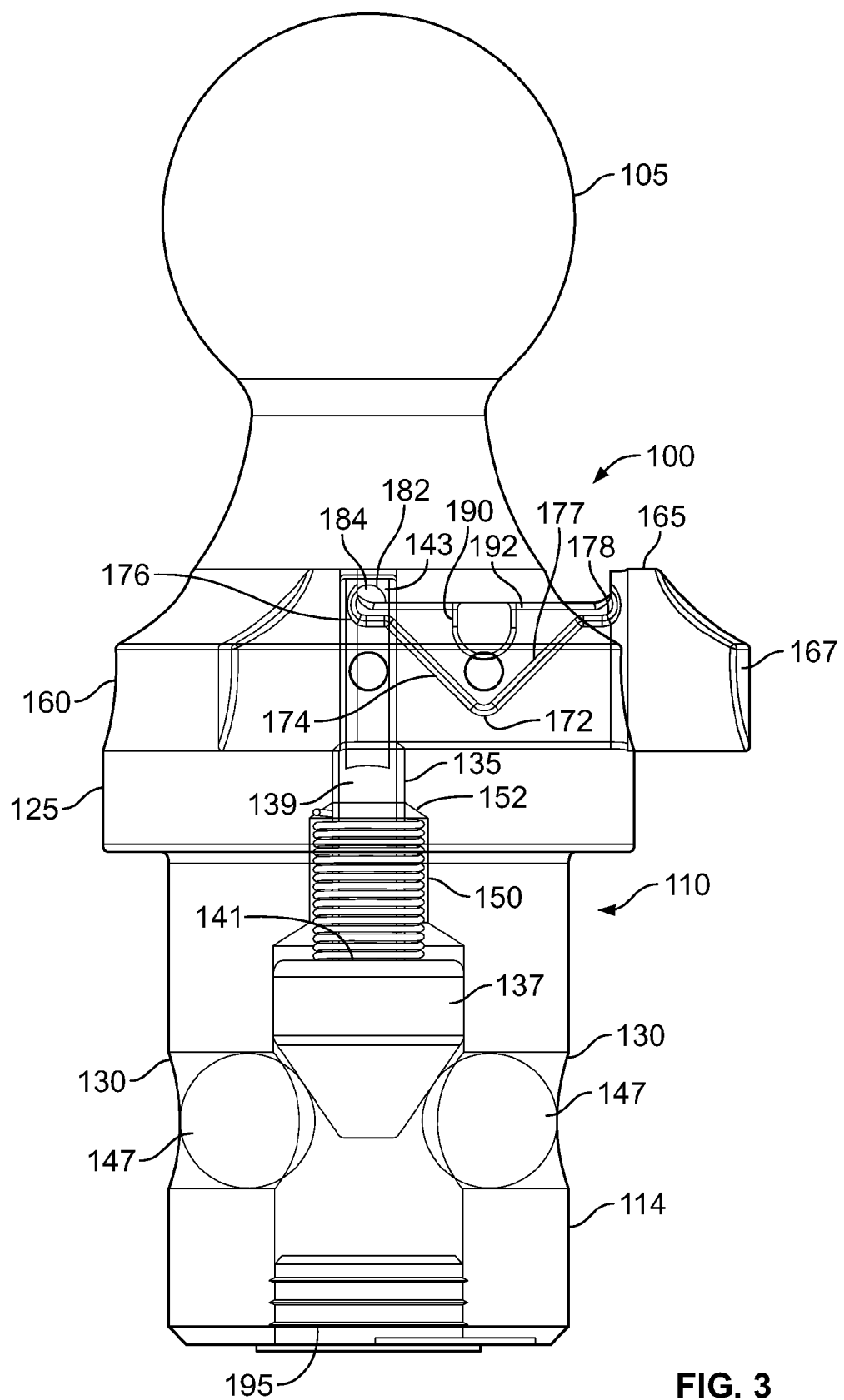
FIG. 3 is an elevational view of the interchangeable hitch ball assembly in an unlocked position with a portion thereof in phantom.
Figure 4:
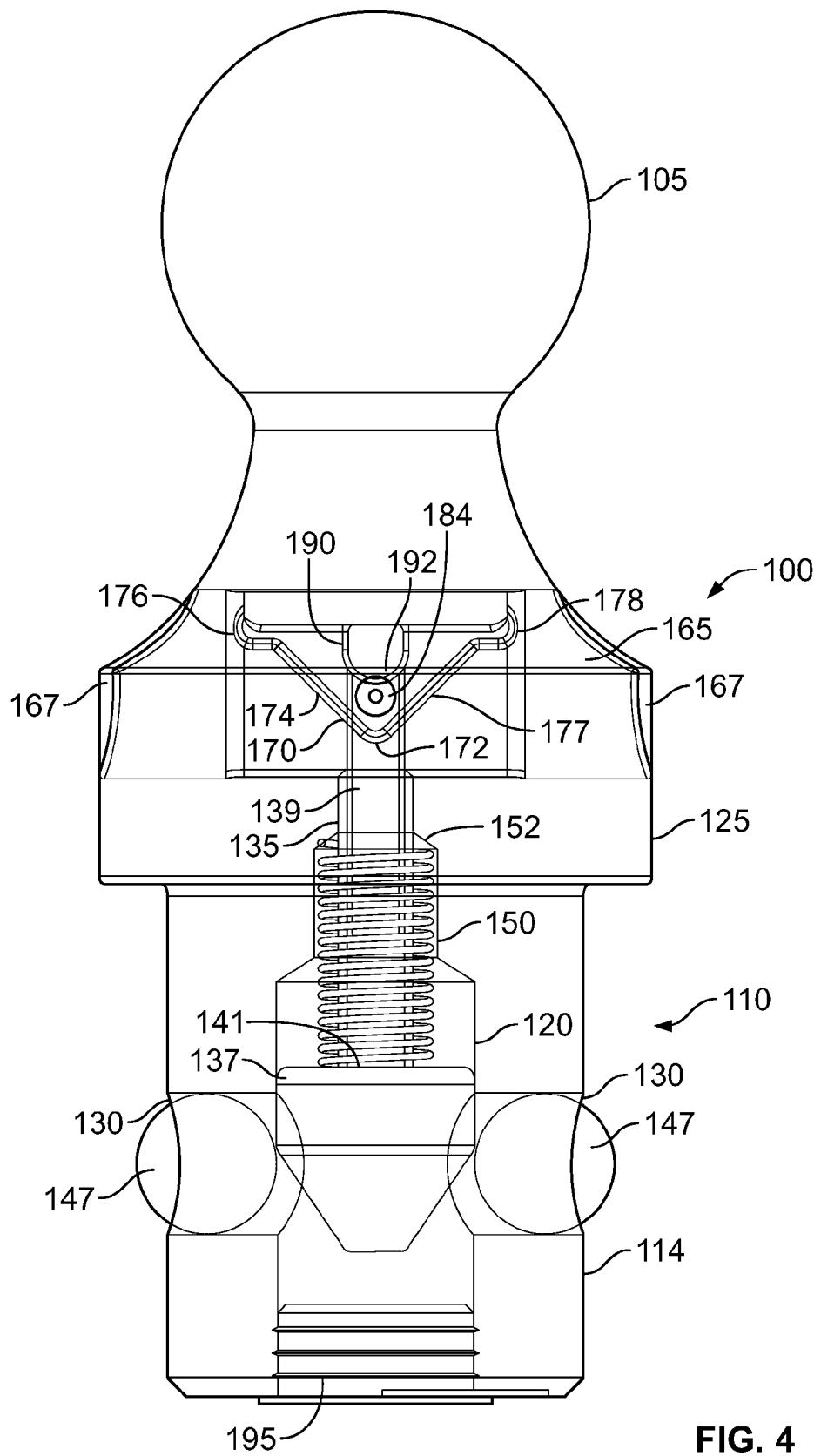
FIG. 4 is an elevational view of the interchangeable hitch ball assembly in an assembly position with a portion thereof in phantom.

The passageway 135 and cavity 120 may allow the elongated member 139 and the plunger 137 to be selectively engaged with one or more locking members 147, such as a ball bearing, for example, between the locked position of FIGS. 1, 2 and 4 and the released or unlocked position of FIG. 3.

In some embodiments, the body 110 of the interchangeable hitch ball assembly 100 may include a slot, aperture, or other opening 160 that may transverse the entire body 110. The opening 160 may be of any appropriate shape and size and is not limited to that shown.

In some embodiments, the interchangeable hitch ball assembly 100 may include a slide or shuttle 165 that may be selectively positionable within the opening 160 from a first or locked position as shown in FIGS. 1, 2, and 4 to a second or unlocked position as shown in FIG. 3. The elongated member 139 may be operatively engaged with the slide 165, or more specifically, the second end 143 of the elongated member 139 may be operatively engaged with the slide 165. The slide 165 may be made of any appropriate material, such as by way of a non-limiting example, it may be made of reinforced nylon plastic or other generally plastic material.

The slide 165 may be of any appropriate construction. In a non-limiting example shown in FIGS. 5 and 6, the slide 165 may include an operator engaging portion 167 that may be located on each side of the slide 165. In some embodiments, the slide 165 may be capable of being selectively positioned in either direction out of the body 110 through the opening 160. Accordingly, the operator engaging portion 167 may be on both sides of the slide 165. The operator engaging portion 167 may be shaped and sized such that an operator may push the slide 165 in the appropriate direction using his or her finger.

The slide 165 may include a generally hollow portion 169 and may include a camming surface or ramp surface 170 that may operatively position the elongated member 139 to and from the first or locked position to the second or unlocked position—or even a third or unlocked position—such that the elongated member 139 positions the plunger 137 to either engage or disengage the locking members 147. The camming surface 170 may include a generally curved slot 172, a ramping surface 174 and a resting slot 176. In some embodiments, the camming surface 170 may include a second ramping surface 177 and a second resting slot 178 whereby the second ramping surface 177 may be generally similar to the ramping surface 174 and the second resting slot 178 may be generally similar to the resting slot 176. In these embodiments, the slide 165 may be positionable in either direction through the body 110 such that the operator may use the operator engaging portion 167 of either side and operatively position the slide 165 in either direction.

Figure 5:
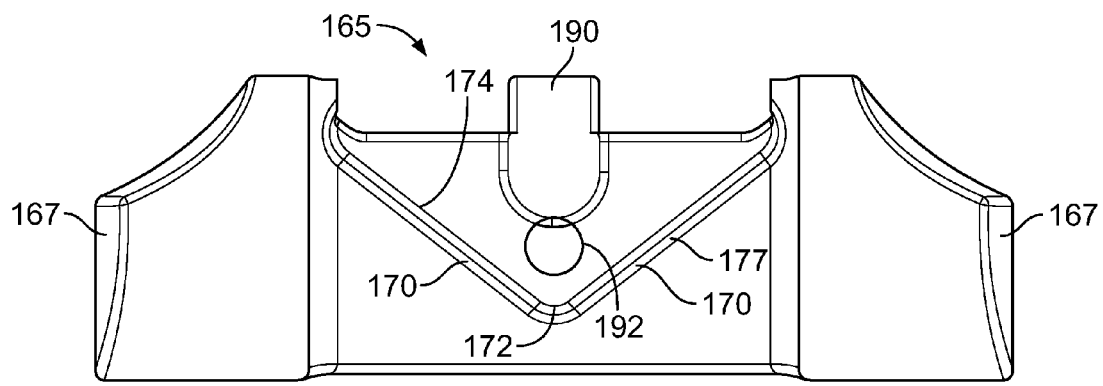
FIG. 5 is an elevational view of a slide assembly of the interchangeable hitch ball assembly with a portion thereof in phantom.
Figure 6:
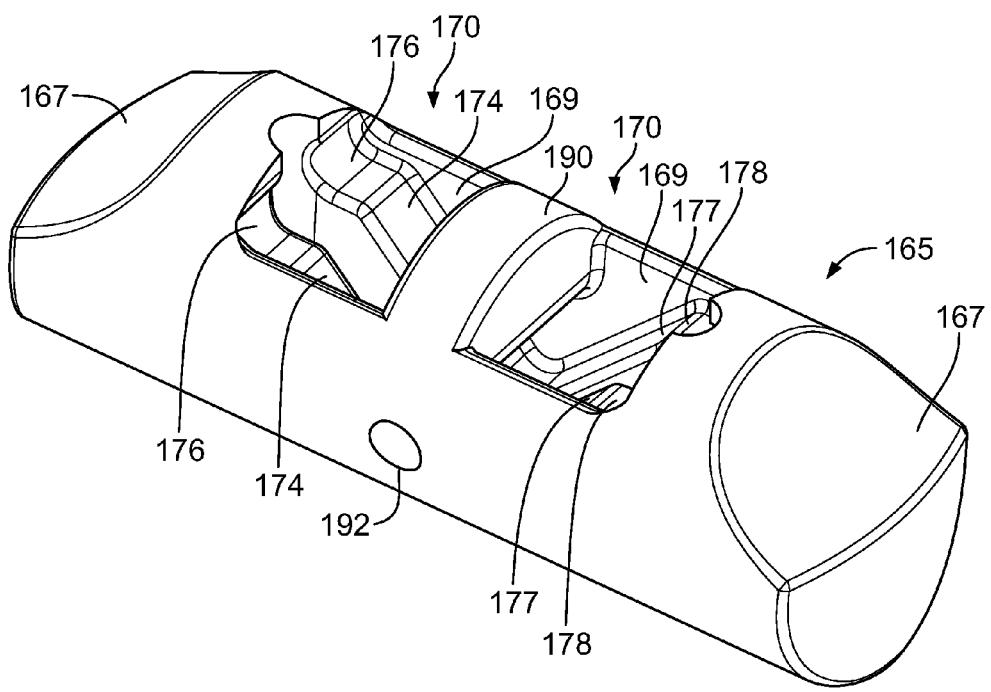
FIG. 6 is a perspective view of the slide assembly of the interchangeable hitch ball assembly.
Figure 7:
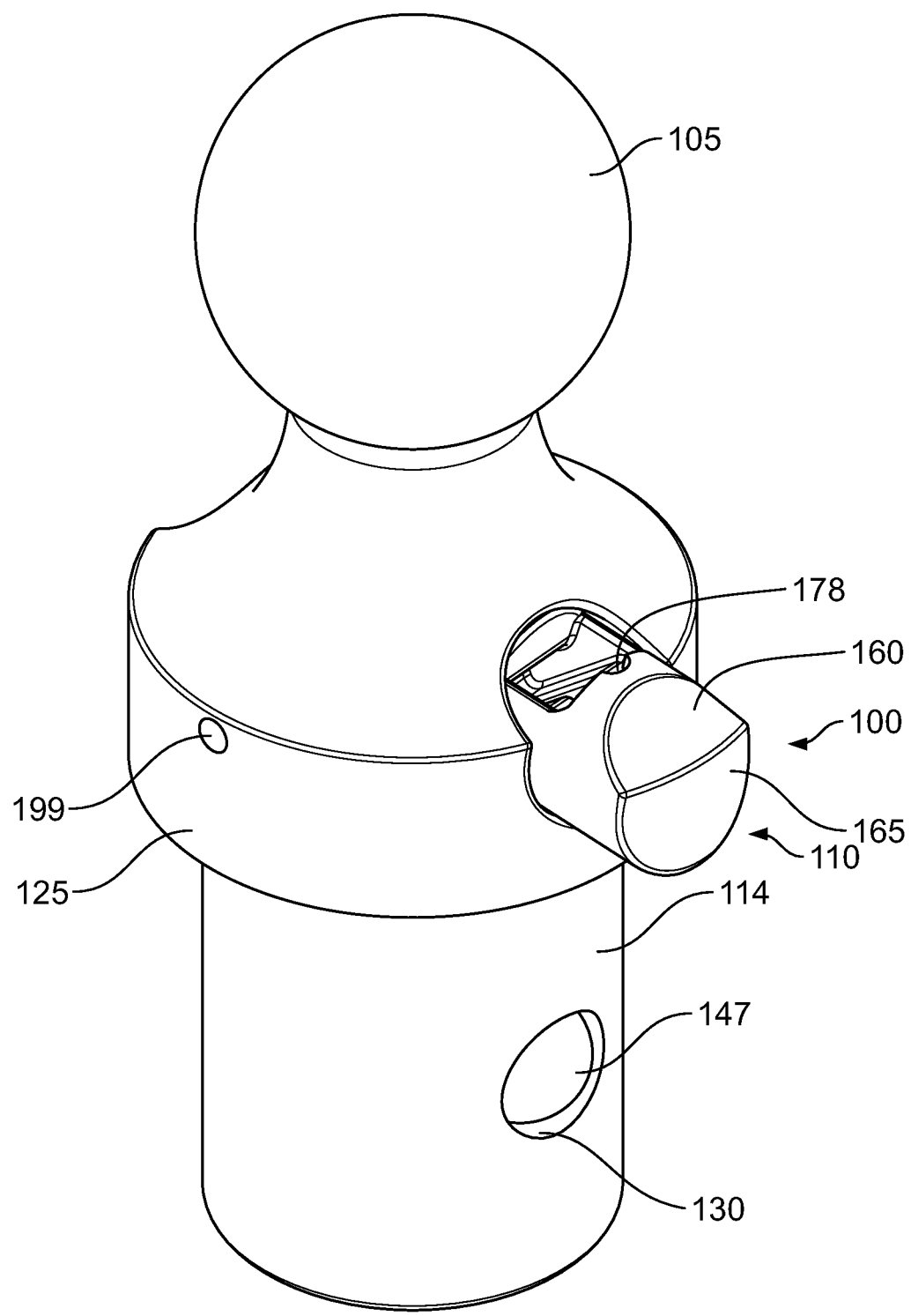
FIG. 7 is a perspective view of the interchangeable hitch ball assembly in an unlocked position.
Figure 8:
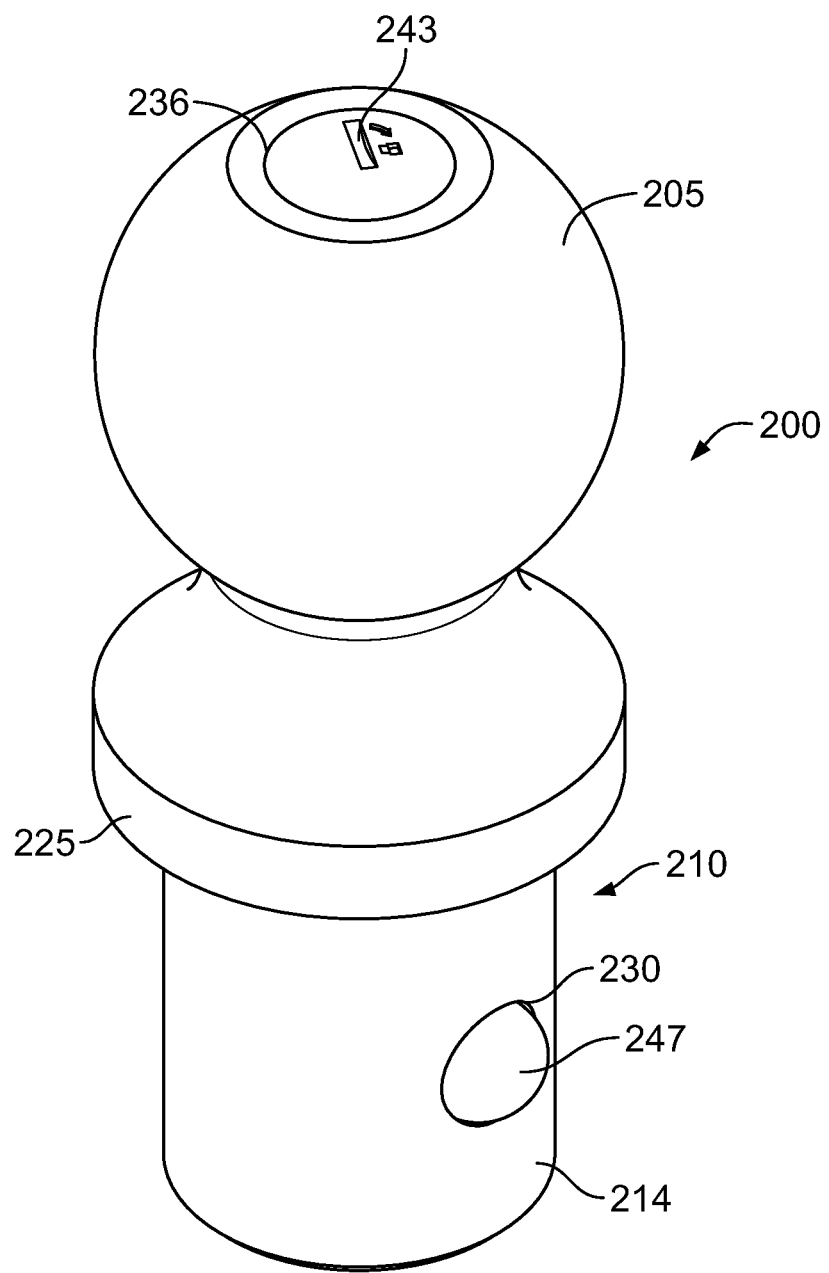
FIG. 8 is a perspective view of other embodiments of an interchangeable hitch ball assembly in a locked position.

It will be appreciated that in some embodiments, as shown in FIG. 5, the resting slots 178, 176 may be removed. For example, the ramping surface 174 or ramping surfaces 174 and 177 may extend the entire length of the camming surface 170.

In some embodiments, the second end 143 of the elongated member 139 may include an aperture 182. A pin, rod, or the like member 184 may be operatively engaged with the aperture 182 such that a portion of the pin member 184 may extend through the aperture 182 and the pin member 184 may extend from the second end 143 of the elongated member 139 a predetermined amount. The pin member 184 may be engaged with the aperture 182 such that it may roll within the aperture 182.

In some embodiments, the pin member 184 may be capable of operatively engaging the camming surface 170. In these embodiments, the pin member 184 may be capable of being selectively positioned from the generally curved slot 172 onto the ramping surface 174. In some embodiments, the pin may be selectively positioned onto the resting slot 176 and held there. More specifically, when the slide 165 is in the locked position as shown in FIGS. 1, 2 and 4, the slide 165 may be generally retained within the opening 160 and the pin member 184 may generally be positioned within the curved slot 172 of the camming surface 170. As the slide 165 is repositioned from the locked position to the unlocked position, the pin member 184 may slide or roll along the ramping surface 174 until the pin member 184 engages the resting slot 176. The pin member 184 may be generally held within the resting slot 176. In the alternative, the slide 165 may be operatively positioned the other direction whereby the pin member 184 may slide or roll from the curved slot 172 up the second ramping surface 177 to the second resting slot 178. In embodiments where the camming surface does not include resting slots 176, 178 then the slide 165 may be generally biased back to the locked position at all times.

In the locked position, the pin member 184 may be resting in the curved slot 172 and the biasing member 150 may biasing the plunger 137 generally downward toward the locking members 147 such that the plunger 137 may force the locking members 147 out of the apertures 130. In these embodiments, the locking members 147 may extend from the insert portion 114 and may engage the receiver such that the interchangeable hitch ball assembly 100 is generally locked in the receiver. As the pin member 184 slides or rolls up the ramping surface 174—or the second ramping surface 177 as the case may be—the elongated member 139 may raise against the bias of the biasing member 150 such that the plunger 137 may move vertically and the locking member 147 may enter the apertures 130. Once the pin member 184 reaches either of the resting slot 176 or the second resting slot 178 or reaches the end of the ramping surface 174 or 177, the elongated member 139 may vertically positions the plunger 137 to disengage the locking members 147 such that the locking members 147 extend within the insert body 114 and the interchangeable hitch ball assembly 100 may be in the unlocked position and may be removed from the receiver. As the pin member 184 may rest in the resting slot 176 or the second resting slot 178, the interchangeable hitch ball assembly 100 may remain in the unlocked position.

The slide 165 may further include a bridge 190 that may be generally positioned between the resting slot 176 and the second resting slot 178. In these embodiments, the bridge 190 may generally prevent the pin member 184 from disengaging from the ramping surface 174 or the second ramping surface 177 as the case may be in the event that the elongated member 139 is not appropriately vertically positioned downward. If the slide 165 is operatively repositioned to the locked position and the pin member 184 does not slide or roll down the ramping surface 174 (or the second ramping surface 177 as appropriate), the bridge 190 may prevent the slide 165 from moving within the opening 160 as it may engage the pin member 184. This may alert the operator that the elongated member 139 is not vertically positioning downward to the locked position.

In some embodiments, the slide 165 may include an aperture 192 and the flange member 125 may include an aperture 194. In these embodiments, to assemble the interchangeable hitch ball assembly 100, the apertures 192, 194 and the aperture 182 of the elongated member 139 may be generally aligned and the pin member 184 inserted therethrough. In order to generally align the apertures 192, 194 and 182, the plunger 137 may be generally vertically positioned upward an appropriate amount, such as by way of a no-limiting example, it may be positioned upward approximately 0.125" as shown in FIG. 4. The plunger 137 may then be released and the apertures 192 and 194 may become generally misaligned with the aperture 182. The apertures 192 and 194 may be positioned such that they generally do not align with the aperture 182 during operating of the interchangeable hitch ball assembly 100, which may generally prevent the pin member 184 from becoming dislodged from the aperture 182.

The interchangeable hitch ball assembly 100 may also include a cap 195. The cap 195 may be provided at the end of the cavity 120 to protect internal components thereof, such as by way of a non-limiting example, the elongated member 139, biasing member 150, and plunger 137 from dirt, dust, and other environmental elements. The cap 195 may be held in place by any appropriate means, such as by a snap or locking ring (not shown). The cap 195 may be of any appropriate shape or size, such as a generally cylindrical shape, by way of a non-limiting example. The cap 195 may be made from any appropriate material, such as plastic, metal, composites, and the like. In this manner, when the interchangeable hitch ball assembly 100 is removed from the vehicle, all the components that could be corroded or affected by environmental conditions can be retained in a dry and secure condition for storage and out of contact with the elements.

As indicated above, the interchangeable hitch ball assembly 100 may be removed from the hitch receiver in a manner that does not require disconnection from the side or underneath of the vehicle. In order to connect and disconnect the interchangeable hitch ball assembly 100 from the vehicle, the slide 165 may be selectively positioned by an operator to the appropriate position. In some embodiments, the interchangeable hitch ball assembly 100 may be positioned in the appropriate receiver. The slide 165 may be positioned such that it is generally held within the opening 160. The pin member 184 may be positioned in the curved slot 172 of the slide 165 and the plunger 137 may engage the locking members 147 forcing them out of the apertures 130 such that they extend beyond the insert portion 114.

To disconnect the interchangeable hitch ball assembly 100, the slide 165 may be operatively positioned in either direction from the opening 160. This may reposition the pin member 184 up the ramping surface 174 (or second ramping surface 177 as appropriate) to the resting slot 176 (or the second resting slot 178 as appropriate). The plunger 137 may then be positioned vertically upward and the locking members 147 may be positioned within the apertures 130 such that they do not extend beyond the insert body 114. In these embodiments, the slide 165 may be held within this unlocked position such that interchangeable hitch ball assembly 100 may remain in the unlocked position and removed from the receiver.

Moreover, while the present interchangeable hitch ball assembly 100 may be described in the context of towing assemblies in association with a vehicle or trailer, however, it will be appreciated that the interchangeable hitch ball assembly 100 may be used in any variety of contexts, and, as such, any reference to towing assemblies or use with trailer and vehicles is illustrative in nature and not restrictive in any way. In addition, the description of the embodiments provided may refer to the use of specific options or materials; however, this should not limit the scope of the invention as claimed. Those skilled in the art will understand that the above descriptions should only be taken as illustrative.

Additional embodiments of an interchangeable hitch ball assembly according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired interchangeable hitch ball assembly without departing from the spirit and scope of the present teachings.

In some embodiments, an interchangeable hitch ball assembly 200 may include a ball member 205 and a body 210. The ball member 205 may be shaped to receive a corresponding socket (not shown) of a coupler of a towed vehicle that may be towed. It is to be understood that the ball member 205 may be of any appropriate or conventional shape and size, such as by way of a non-limiting example being generally spherical in shape. The ball member 205 may also be a separate piece from the body 210 or may be integrally formed with the body 210 through forming as a single piece. If the ball member 205 and body 210 are separate pieces, they may be secured together by any appropriate means, such as by fasteners, welding, adhesives or the like. The interchangeable hitch ball assembly 200 may be removably secured to a hitch receiver on an automobile, truck, SUV, or other vehicle in any appropriate manner. By way of a non-limiting example, the interchangeable hitch ball assembly 200 may be selectively secured to a hitch receiver as shown and described as being part of an under bed gooseneck hitch mounting system.

In some embodiments, the body 210 may include an insert portion 214. The insert portion 214 may be of any appropriate shape or size, such as being shaped for insertion into a hitch receiver of a gooseneck coupler. Although illustrated as substantially cylindrical in shape, it is to be understood that the insert portion 214 may be shaped to accommodate any type of hitch receiver and as such may be of any appropriate shape and size; such as by way of non-limiting example being generally square, rectangular, oval or the like cross-sectional shape.

The insert portion 214 may also include a cavity 220. The cavity 220 may be positioned at any appropriate location within the insert portion 214. The cavity 220 may be of any appropriate shape or size, such as by way of a non-limiting example being a generally cylindrical shape. The body 210 may also be provided with a flange member 225. The flange member 225 may be of any appropriate shape or size. In some embodiments, the flange member 225 may be adapted to rest on a hitch receiver. The insert portion 214 may also include an aperture 230. In some embodiments, the insert portion 214 may include a pair of apertures 230 such that the apertures 230 may be located through the insert portion 214. The apertures 230 may be of any appropriate shape or size, such as by way of non-limiting examples being generally cylindrical, circular, oval, square, rectangular, polygonal or the like shape. The apertures 230 may also be positioned at any appropriate location on the insert portion 214, such as being transversely positioned from each other.

The interchangeable hitch ball assembly 200 may also include a passageway 235. The passageway 235 may be of any appropriate shape or size, such as by way of a non-limiting example being a generally cylindrical shape. In some embodiments, the passageway 235 may extend through the body 210 into the cavity 220 within the insert portion 214. In some embodiments, the passageway 235 may extend into the ball member 205.

The interchangeable hitch ball assembly 200 may also include a plunger 237. The plunger 237 may be located within the cavity 220 of the insert portion 214 and in the passageway 235 of the ball member 205 through an aperture 236 in the ball member 205. The plunger 237 may be of any appropriate shape or size, such as by way of a non-limiting example being of a generally cylindrical shape. The plunger 237 may include a first end 241 and a second end 242. In some embodiments, the second end 242 of the plunger 237 may have a generally larger diameter than the first end 241 of the plunger 237. However, in other embodiments, the first and second ends 241, 242 may be of generally similar diameters. The first end 241 of the plunger 237 may include a generally slotted head 243.

In some embodiments, the plunger 237 may include a channel 244, and in some embodiments, the plunger 237 may include a pair of channels 244 that may be of generally similar shape and size. The channels 244 may be of any appropriate shape. In some embodiments, the channels 244 may be of a generally J-shape. However, the present teachings are not limited to such a shape. The channels 244 may include a locking member cavity 247, a channel body 248 and a locking cavity 249, which may form the generally J-shaped channel. The channels 244 may be integrally formed with the plunger 237 or may be subsequently formed such as through a machining operation.

The interchangeable hitch ball assembly 200 may further include a locking member 253, such as by way of a non-limiting example, a pair of generally circular ball bearing members. It should be understood, however, that the locking members 253 may be of any appropriate shape and size and are not limited to the ball bearings shown in the drawings. The locking members 253 may be selectively positionable from a locked position whereby the locking members 253 may extend generally out of the apertures 230 to and from an unlocked position whereby the locking members 253 may be generally positioned within the apertures 230. In some embodiments, the locking members 253 may extend out of the insert portion 214 and in the unlocked position may be positioned within the insert portion 214.

The interchangeable hitch ball assembly 200 may further include a biasing member 260. The biasing member 260 may be of any appropriate type of biasing means, such as by way of a non-limiting example being a spring, or more specifically a compression spring. The biasing member 260 may be positioned between an end portion 261 of the cavity 220 and the second end 244 of the plunger 237. The biasing member 260 biases the plunger 237 in a vertically upward position to an unlocked position as shown in FIGS. 9 and 10.

Figure 9:
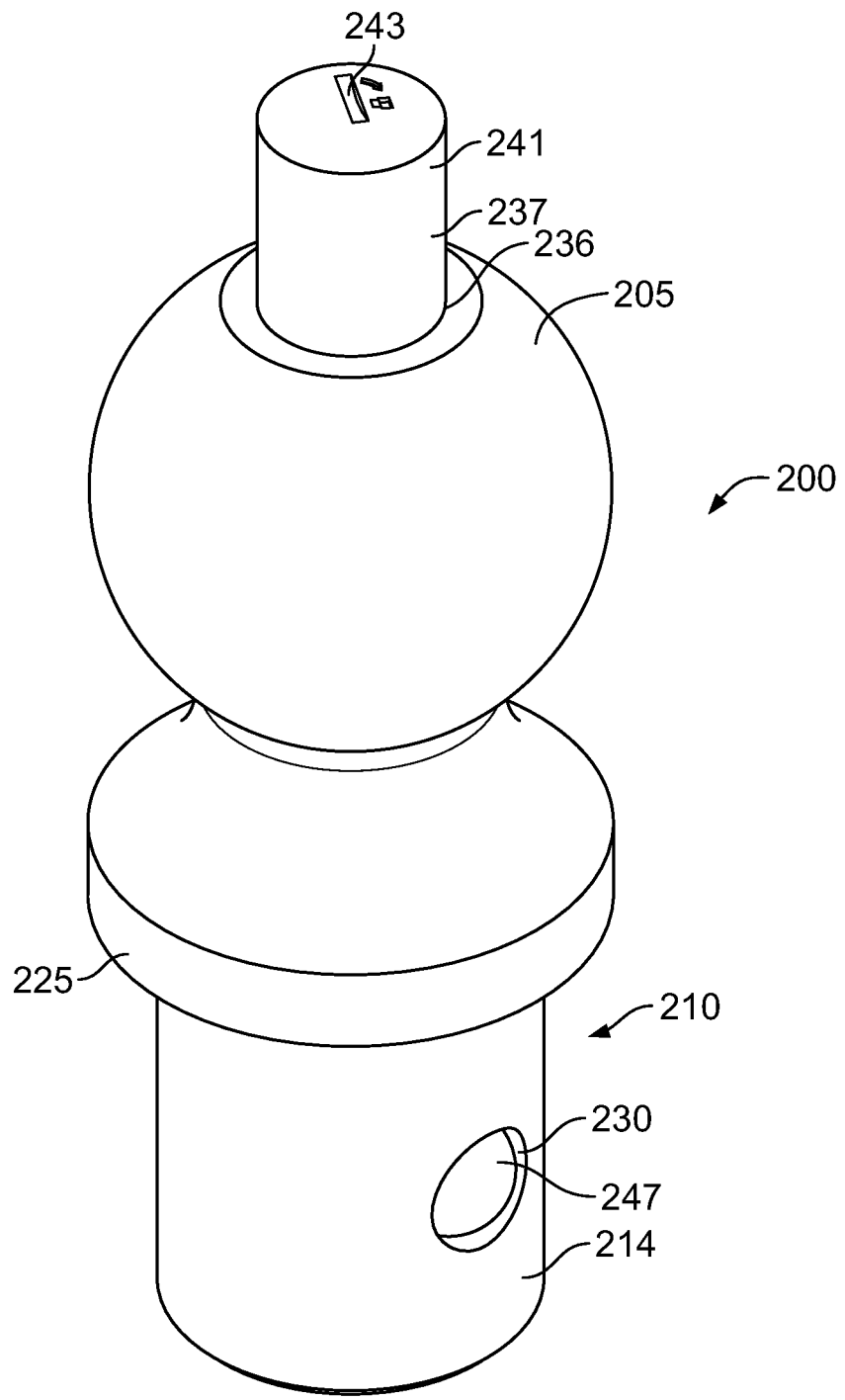
FIG. 9 is a perspective view of the interchangeable hitch ball assembly of FIG. 7 in an unlocked position.
Figure 10:
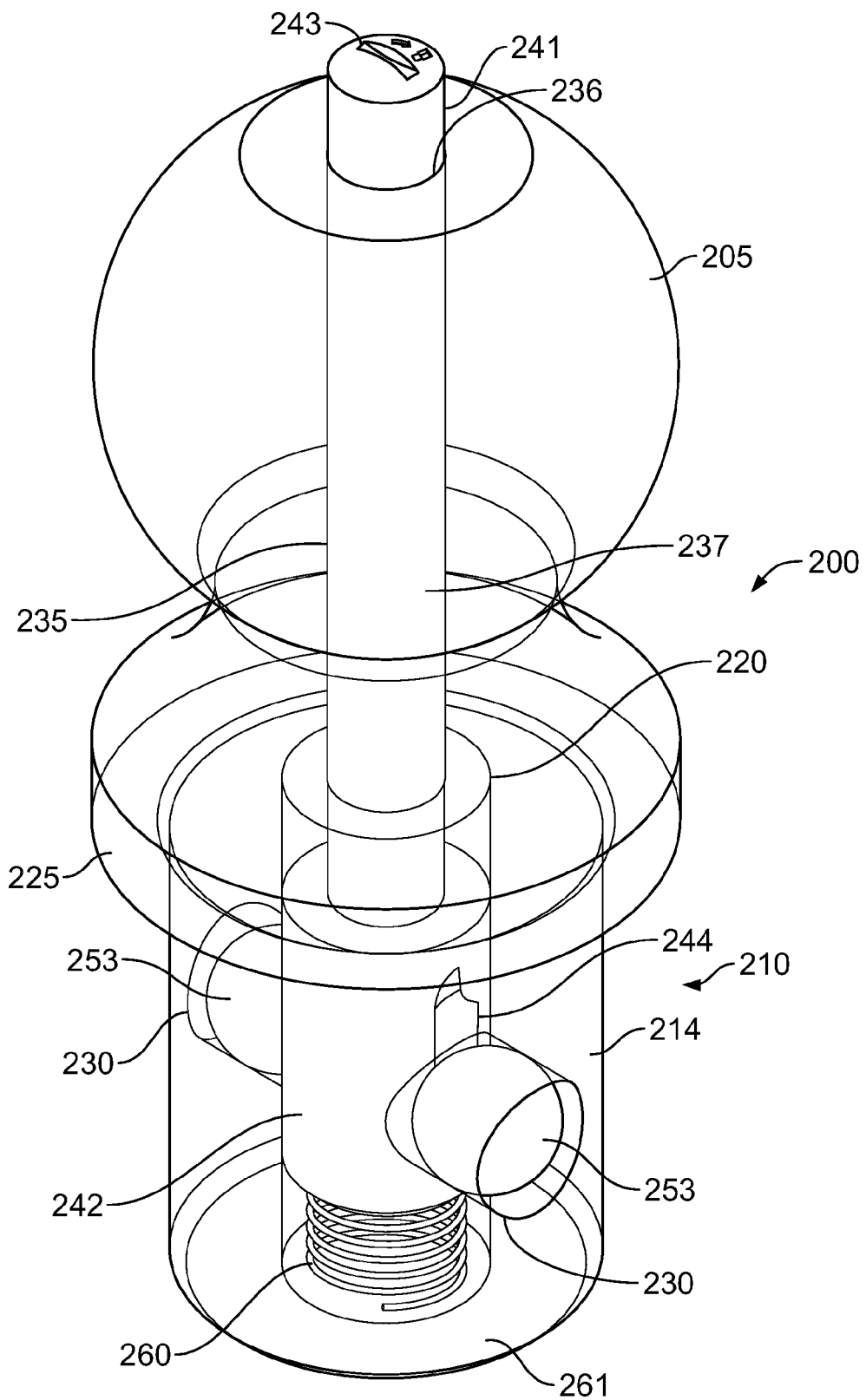
FIG. 10 is a perspective view of other embodiments of an interchangeable hitch ball assembly in an unlocked position with a portion thereof in phantom.
Figure 11:
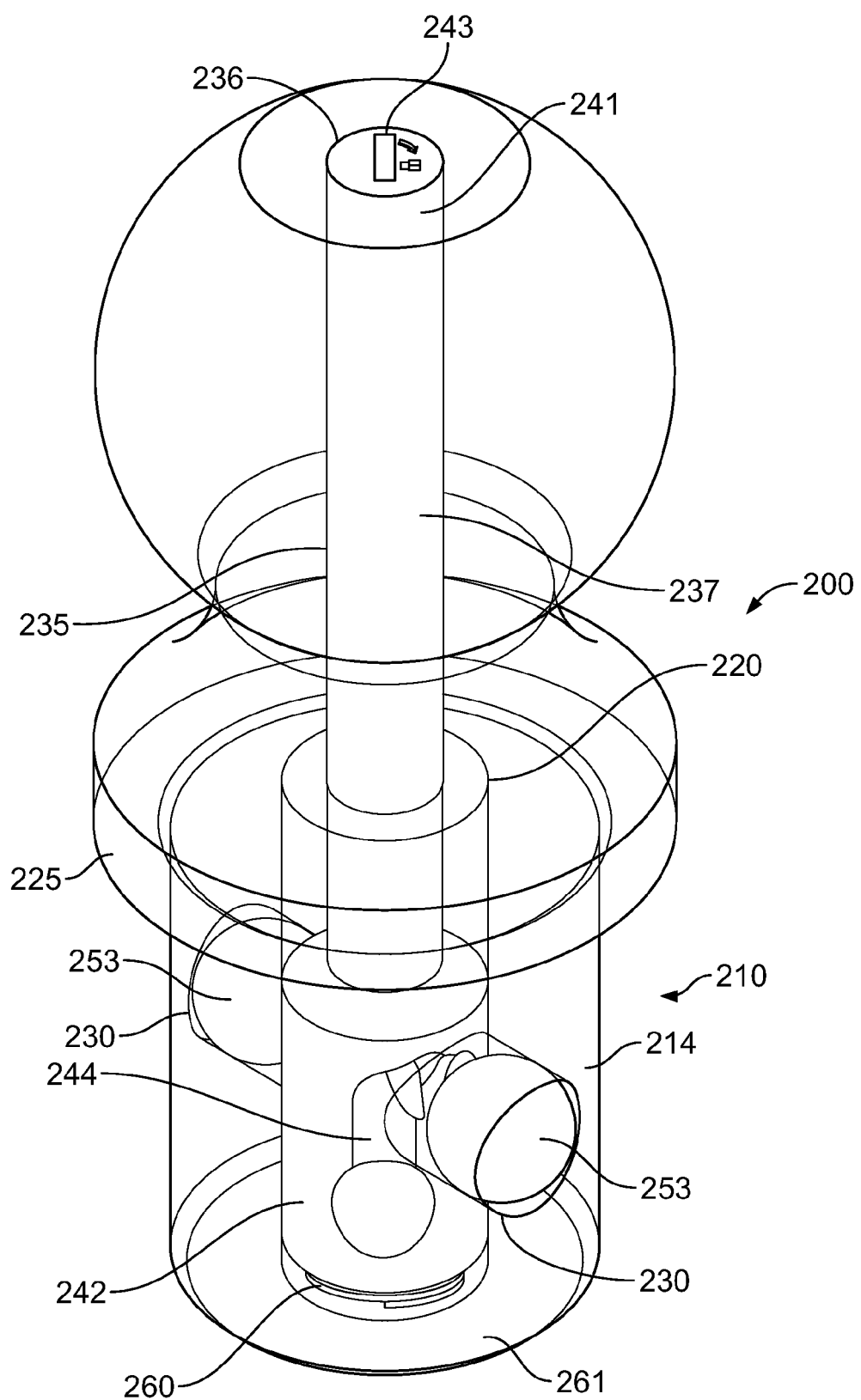
FIG. 11 is a perspective view of the interchangeable hitch ball assembly of FIG. 10 in a locked position with a portion thereof in phantom.

In these embodiments, the locking members 253 may be positioned in the locking member cavity 247 when the interchangeable hitch ball assembly 200 is in the unlocked position in FIGS. 9 and 10. The plunger 237 may be selectively rotated and pushed against the bias of the biasing member 260. As the plunger 237 rotates the channel body 248 selectively positions the locking members 253 toward a locking position. The plunger 237 may be rotated until the locking members 253 engage the locking cavity 249 of the plunger 237 and at least a portion of the locking members 253 extend from the apertures 230 and extend beyond the insert portion 214. The locking members 253 may engage the receiver and may lock the interchangeable hitch ball assembly 200 in the appropriate position. In some embodiments, a mechanical means such as a screwdriver, coin or the like may engage the slotted head 243 to generally assist with rotation of the plunger 237.

In order to unlock the interchangeable hitch ball assembly 200, the plunger 237 may be rotated in a generally opposite direction until the locking members 253 may be selectively positioned within the apertures 230. In these embodiments, as the plunger 237 rotates, the locking members 253 may engage the channel body 248. As the plunger 237 is further rotated, the locking members 253 may engage the locking member cavity 247. The locking member cavity 247 may be sized and shaped to generally permit the locking members 253 to withdrawal within the apertures 230.

These embodiments of the interchangeable hitch ball assembly 200 may generally prevent dirt and debris from entering within the cavity 220. If, however, dirt and debris were to enter the cavity 220, the interchangeable hitch ball assembly 200 may be of a construction to dislodge the dirt and debris during operation thereof.

Other embodiments of an interchangeable hitch ball assembly 300 include a ball member 305 and a body 310. The ball member 305 may be shaped to receive a corresponding socket (not shown) of a coupler of a towed vehicle that may be towed. It is to be understood that the ball member 305 may be of any appropriate or conventional shape and size, such as by way of a non-limiting example being generally spherical in shape. The ball member 305 may also be a separate piece from the body 310 or may be integrally formed with the body 310 through forming as a single piece. If the ball member 305 and body 310 are separate pieces, they may be secured together by any appropriate means, such as by fasteners, welding, adhesives or the like. The interchangeable hitch ball assembly 300 may be removably secured to a hitch receiver on an automobile, truck, SUV, or other vehicle in any appropriate manner. By way of a non-limiting example, the interchangeable hitch ball assembly 300 may be selectively secured to a hitch receiver as shown and described as being part of an under bed gooseneck hitch mounting system.

In some embodiments, the body 310 may include an insert portion 314. The insert portion 314 may be of any appropriate shape or size, such as being shaped for insertion into a hitch receiver of a gooseneck coupler. Although illustrated as substantially cylindrical in shape, it is to be understood that the insert portion 314 may be shaped to accommodate any type of hitch receiver and as such may be of any appropriate shape and size; such as by way of non-limiting example being generally square, rectangular, oval or the like cross-sectional shape.

The insert portion 314 may also include a cavity 320. The cavity 320 may be positioned at any appropriate location within the insert portion 314. The cavity 320 may be of any appropriate shape or size, such as by way of a non-limiting example being a generally cylindrical shape. The body 310 may also be provided with a flange member 325. The flange member 325 may be of any appropriate shape or size. In some embodiments, the flange member 325 may be adapted to rest on a hitch receiver. The insert portion 314 may also include an aperture 330. In some embodiments, the insert portion 314 may include a pair of apertures 330 such that the apertures 330 may be located through the insert portion 314. The apertures 330 may be of any appropriate shape or size, such as by way of non-limiting examples being generally cylindrical, circular, oval, square, rectangular, polygonal or the like shape. The apertures 330 may also be positioned at any appropriate location on the insert portion 314, such as being transversely positioned from each other.

The interchangeable hitch ball assembly 300 may also include a passageway 335. The passageway 335 may be of any appropriate shape or size, such as by way of a non-limiting example being a generally cylindrical shape. In some embodiments, the passageway 335 may extend through the body 310 into the cavity 320 within the insert portion 314. In some embodiments, the passageway 335 need not extend into the ball member 305.

The interchangeable hitch ball assembly 300 may also include a plunger 337. The plunger 337 may be located within the cavity 320 of the insert portion 314. The plunger 337 may be of any appropriate shape or size and is not limited to that shown in the drawings. The interchangeable hitch ball assembly 300 may also include an elongated member 339. The elongated member 339 may be of any appropriate shape or size, such as by way of a non-limiting example being of a generally cylindrical shape. The elongated member 339 may include a first end 341 and a second end 343. The first end 341 may be operatively connected to the plunger 337 in any appropriate manner, such as by way of non-limiting examples, being fastened, welded, using adhesives, or the like.

The interchangeable hitch ball assembly 300 may further include a locking member 347, such as by way of a non-limiting example, a pair of generally circular ball bearing members. It should be understood, however, that the locking members 347 may be of any appropriate shape and size and are not limited to the ball bearings shown in the drawings. The locking members 347 may be selectively positionable from a locked position whereby the locking members 347 may extend generally out of the apertures 330 to and from an unlocked position whereby the locking members 347 may be generally positioned within the apertures 330. In some embodiments, the locking members 347 may extend out of the insert portion 314 and in the unlocked position may be positioned within the insert portion 314.

The interchangeable hitch ball assembly 300 may further include a biasing member 350. In some embodiments, the body 310 may include a lip 352 that may be located above the cavity 320. The biasing member 350 may be of any appropriate type of biasing means, such as by way of a non-limiting example being a spring, or more specifically a compression spring. The biasing member 350 may be positioned along the elongated member 339 between the plunger 337 and the lip 352 of the body 310 to bias the plunger 337 toward the locking members 347. The biasing member 350 may bias the plunger 337 vertically downward toward a locked position.

Figure 14:
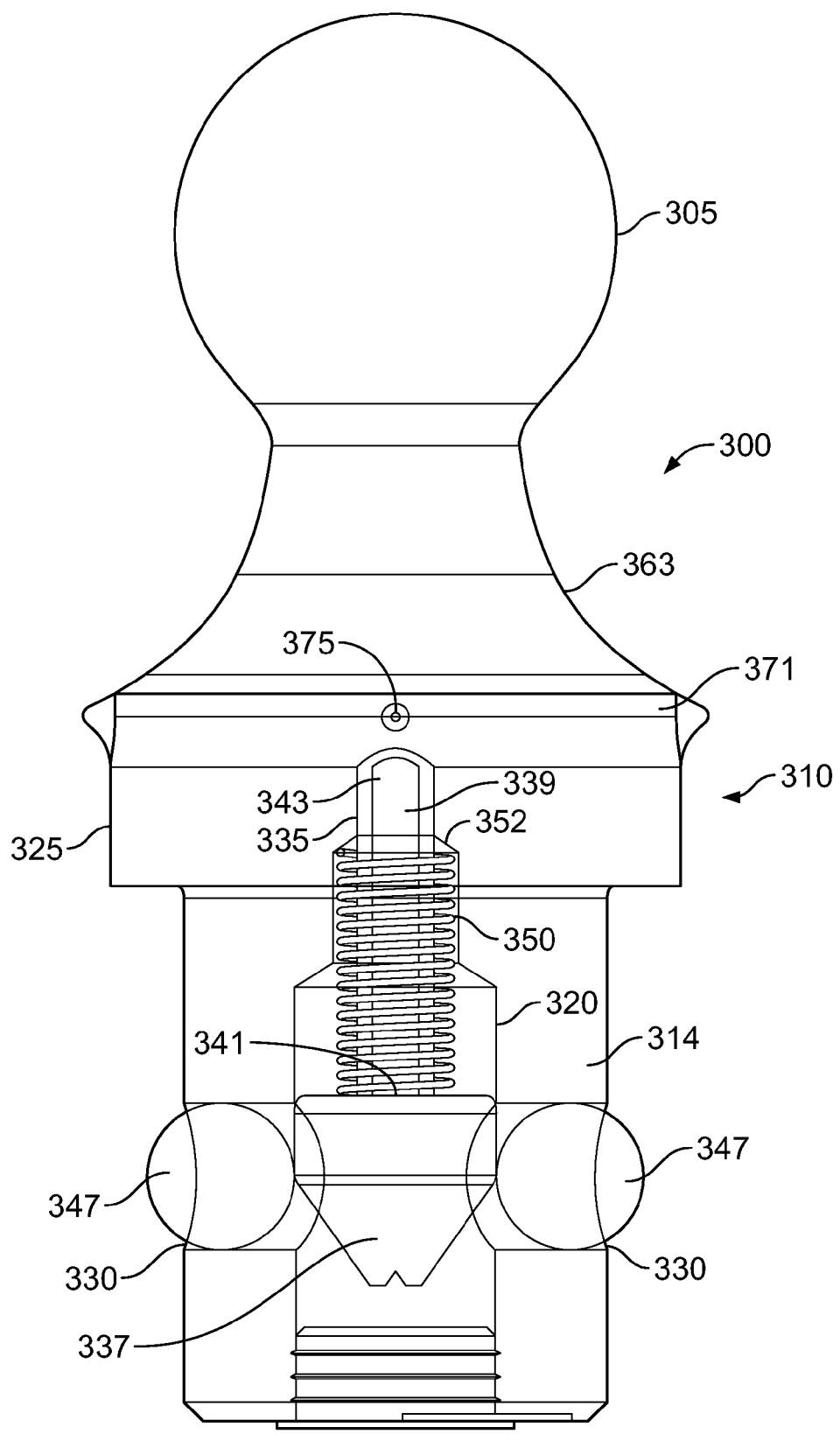
FIG. 14 is an elevational view of the interchangeable hitch ball assembly of FIG. 13 in the locked position with a portion thereof in phantom.
Figure 15:
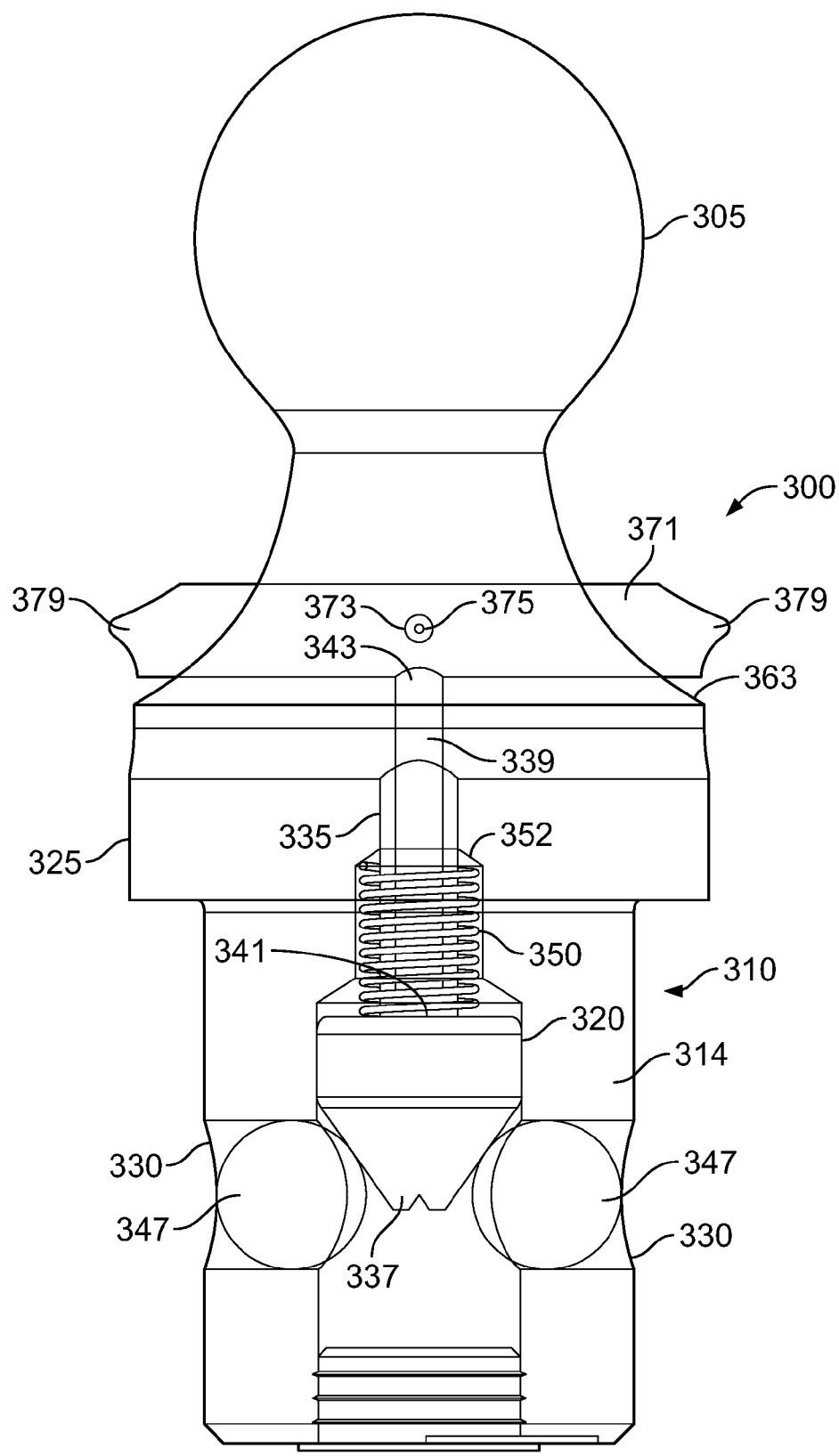
FIG. 15 is an elevational view of the interchangeable hitch ball assembly of FIG. 13 in an unlocked position with a portion thereof in phantom.

The passageway 335 and cavity 320 may allow the elongated member 339 and the plunger 337 to be selectively engaged with one or more locking members 347, such as a ball bearing, for example, between the locked position of FIG. 14 and the released or unlocked position of FIG. 15.

In the locked position, the plunger 337 may engage the locking members 347 to push the locking members 347 outwardly beyond the insert portion 314 via the apertures 330. In turn, the locking members 347 may engage, for example, an inner portion of a hitch receiver to generally prevent the interchangeable hitch ball assembly 300 from being removed from the hitch receiver. Such a configuration may ensure that the interchangeable hitch ball assembly 300 may remain in the locked position to generally prevent disconnection from the hitch receiver while towing.

The interchangeable hitch ball assembly 300 may include a slot or opening 363 that may generally extend the entire width of the hitch ball assembly 300. More specifically, the opening 363 may be positioned in the body 310 and may be vertically below the ball member 305. The interchangeable hitch ball assembly 300 may further include a lift bar 371, a non-limiting example of which is shown in FIG. 16. The lift bar 371 may be generally shaped and sized to operatively fit within the opening 363 and may be capable of being selectively positioned from a first or locked position in FIG. 14 to a second or unlocked position in FIG. 15. The opening 363 may of such a size to permit such selective positioning of the lift bar 371.

The lift bar 371 may be operatively coupled to the elongated member 339. In some embodiments, the lift bar 371 may include a first aperture (not shown) through which the second end 342 of the elongated member 339 may be inserted. In these embodiments, the lift bar 371 may include a second aperture 373 through which a pin 375 may pass to fastening the elongated member 339 to the lift bar 371. In other embodiments, the lift bar 371 may be secured to the elongated member 339 in any appropriate manner, such as by fastening, welding, using adhesives or the like. The lift bar 371 may include operator engaging portions 379. In some embodiments, a pair of operator engaging portions 379 may be used and may be transversely positioned from each other as shown in FIG. 16.

In these embodiments, the interchangeable hitch ball assembly 300 may be removed from the hitch receiver in a manner that may not require disconnection from the side or underneath of the vehicle. In order to connect the interchangeable hitch ball assembly 300 to the vehicle, an operator may insert the insert body 314 into the receiver as far as it will extend. The operator may then engage the operator engaging portions 379 of the lift bar 371 and selectively position the lift bar 371 vertically upward. By lifting the lift bar 371 vertically upward, the elongated member 339 moves vertically upward and moves the plunger 337 vertically upward against the bias of the biasing members 350. The plunger 337 may disengage the locking members 347 and the locking members 347 may be selectively positioned within the insert body 314 in the apertures 330. This may permit the insert body 314 to be inserted within the receiver.

After insertion of the interchangeable hitch ball assembly 300 into the receiver, the operator may release the lift bar 371. The bias of the biasing member 350 may force the plunger 337 generally vertically downward and the plunger 337 may engage the locking members 347. This may selectively position the locking members 347 generally out of the apertures 330 and the locking members 347 may engage the receiver selectively locking the interchangeable hitch ball assembly 300 to the receiver.

In order to remove the interchangeable hitch ball assembly 300 from the hitch receiver, the operator may lift the lift bar 371. Lifting the lift bar 371 against the bias of the biasing member 350 may allow the plunger 337 to be vertically displaced upward disengaging the locking members 347 from the receiver. The locking members 347 may enter the apertures 330 such that they do not extend beyond the insert body 314, which may thereby allow the interchangeable hitch ball assembly 300 to be removed from the hitch receiver.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A hitch ball assembly comprising:
a ball member;
a body connected to said ball member;
a longitudinal passageway within said body;
at least one locking member in communication with said passageway;
an elongated member located within said passageway and biased to engage said at least one locking member;
an opening in said body transverse to said passageway; and
a release mechanism positioned within said opening and in communication with said elongated member to move said elongated member between a locked position and an unlocked position, said release mechanism including a slide moveable within said opening, said slide including a camming surface in communication with said elongated member, said camming surface including a first resting slot holding said elongated member in said unlocked position and a second resting slot spaced from said first resting slot.

2. The hitch ball assembly of claim 1 further comprising a bridge portion above said camming surface.

3. The hitch ball assembly of claim 1, wherein said elongated member includes a pin in contact with said camming surface.

4. The hitch ball assembly of claim 1, wherein said camming surface includes a first ramped surface.

5. The hitch ball assembly of claim 4, wherein said camming surface includes a second ramped surface opposite said first ramped surface.

6. The hitch ball assembly of claim 5 further comprising a curved slot between said first ramped surface and said second ramped surface.

7. The hitch ball assembly of claim 4, wherein said first resting slot is adjacent to said first ramped surface.

8. The hitch ball assembly of claim 7, wherein said second resting slot is adjacent to said second ramped surface.

9. The hitch ball assembly of claim 1, wherein said at least one locking member comprises one or more ball bearings.

10. The hitch ball assembly of claim 9, wherein said one or more ball bearings are movable within an opening in said body.

11. The hitch ball assembly of claim 10 further comprising a plunger positioned at an end of said elongated member and configured to engage said ball bearings.

12. The hitch ball assembly of claim 1, wherein said elongated member is biased by a spring.

13. The hitch ball assembly of claim 1 further comprising a cap positioned at an end of said passageway.

14. A hitch ball assembly comprising:
a ball member;
a body connected to said ball member, said body having a passageway;
an elongated member located within said passageway;
at least one locking member in communication with said elongated member;
an opening in said body generally transverse to said elongated member; and
a slide positioned within and moveable with respect to said opening;
a camming surface positioned on said slide;
a pin attached with said elongated member, said pin rolls along said camming surface to move said elongated member between a locked position and an unlocked position.

15. The hitch ball assembly of claim 14, further comprising a longitudinal passageway with said body.

16. The hitch ball assembly of claim 15, wherein the elongated member is located within said passageway, said at least one locking member in communication with said passageway.

17. The hitch ball assembly of claim 14, wherein said camming surface includes a first ramped surface.

18. The hitch ball assembly of claim 17, wherein said camming surface includes a second ramped surface opposite said first ramped surface.

19. The hitch ball assembly of claim 18 further comprising a curved slot between said first ramped surface and said second ramped surface.

20. The hitch ball assembly of claim 17, wherein said camming surface includes a first resting slot adjacent to said first ramped surface.

21. The hitch ball assembly of claim 14, wherein said pin generally prevents said slide from being removed from said opening.

22. A hitch ball assembly comprising:
a ball member;
a body connected to said ball member, said body member including a longitudinal passageway;
an elongated member located within said passageway;
at least one locking member in communication with said elongated member;
an opening in said body generally transverse to said elongated member; and
a slide positioned within and moveable with respect to said opening;
a camming surface positioned on said slide;
a pin attached with said elongated member and engaged with said camming surface, wherein said pin generally prevents said slide from being removed from said opening.

23. The hitch ball assembly of claim 22, wherein said pin rolls along said camming surface to move said slide between a locked position and an unlocked position.

24. The hitch ball assembly of claim 22, wherein the elongated member is biased to engage said at least one locking member.

25. The hitch ball assembly of claim 22, wherein said camming surface includes a first ramped surface.

26. The hitch ball assembly of claim 25, wherein said camming surface includes a second ramped surface opposite said first ramped surface.

27. The hitch ball assembly of claim 26 further comprising a curved slot between said first ramped surface and said second ramped surface.

28. The hitch ball assembly of claim 25, wherein said camming surface includes a first resting slot adjacent to said first ramped surface.

* * * * *